UNITED STATES PATENT OFFICE.

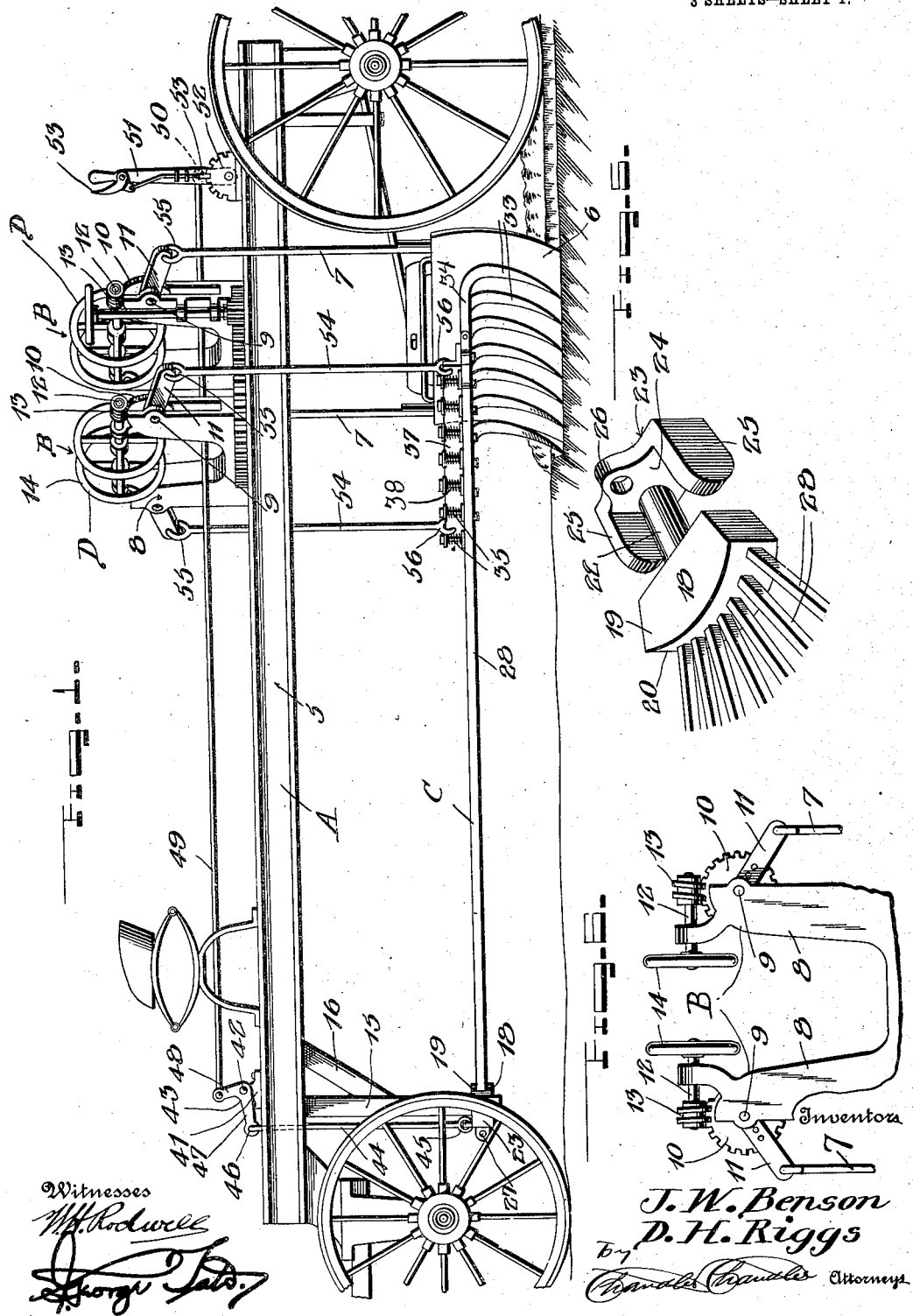

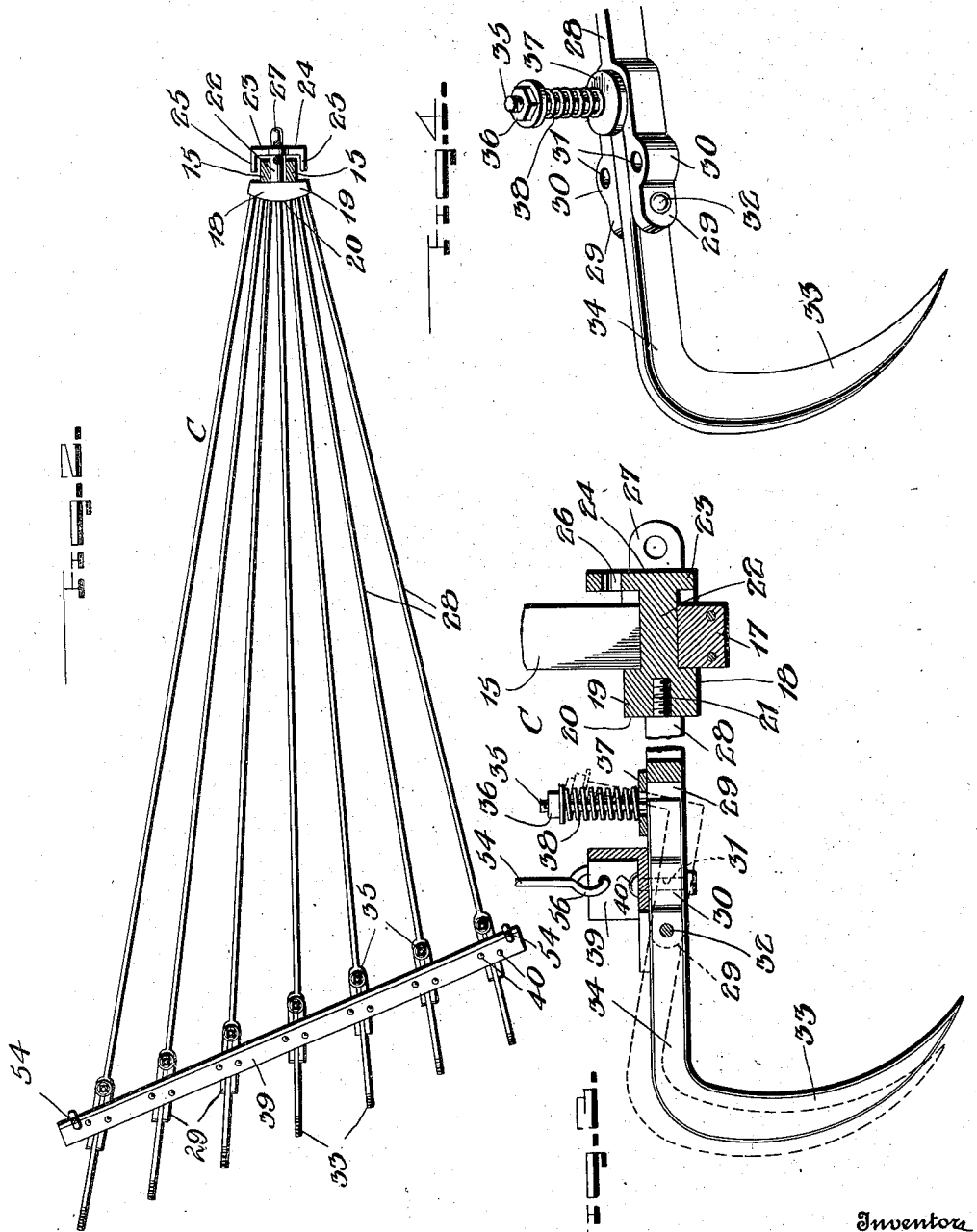

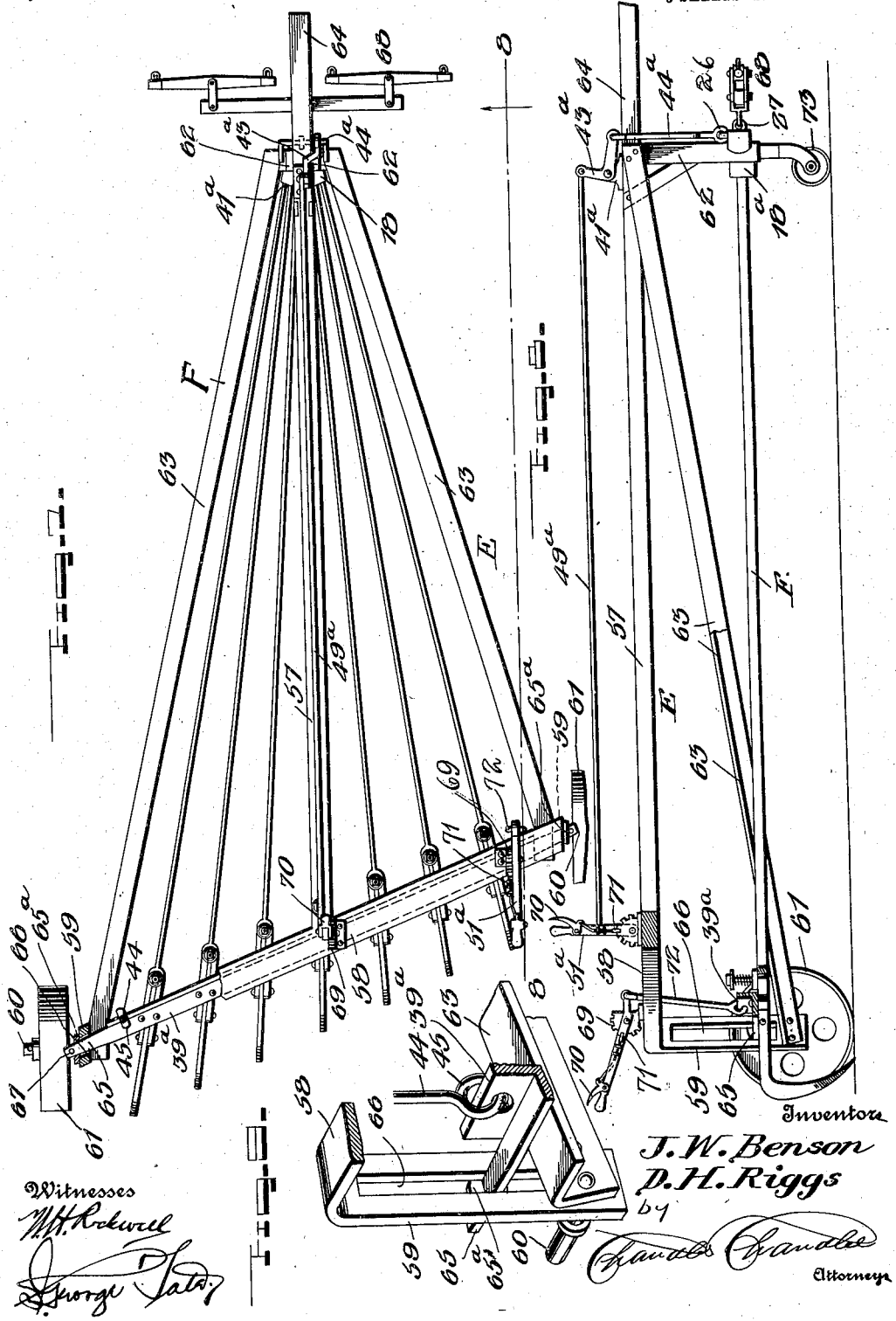

JOHN W. BENSON AND DOUGLASS H. RIGGS, OF BROOKEVILLE, MARYLAND.

RAKE.

1,088,199.  Specification of Letters Patent.  Patented Feb. 24, 1914.

Application filed June 3, 1912. Serial No. 701,327.

*To all whom it may concern:*

Be it known that we, JOHN W. BENSON and DOUGLASS H. RIGGS, citizens of the United States, residing at Brookeville, in the county of Montgomery, State of Maryland, have invented certain new and useful Improvements in Rakes; and we do hereby declare the following to be a full, clear, and exact description of the invention, such as will enable others skilled in the art to which it appertains to make and use the same.

This invention relates to improvements in rakes for road scraping machines.

The principal object of the invention is to provide a rake of the character described arranged in advance of the scraper blade for loosening the earth so that said blade may be enabled to easily perform its function.

Another object of the invention is to provide in a machine of the character described a rake which is mounted for both lateral and longitudinal movements, whereby said rake may be easily accommodated to different road surfaces.

A still further object of the invention is to provide a machine of the character described in which the parts are arranged to be within ready control of the operator.

Another object of the invention is to provide a machine for the purpose described which is extremely simple in construction, it being composed of a minimum number of parts, is therefore simple in construction and cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a side elevation of a conventional road scraping machine showing the application of our invention, Fig. 2 is a top plan view of the rake frame, Fig. 3 is a detail longitudinal sectional view therethrough, Fig. 4 is a detail perspective view showing the means for yieldably supporting the rake teeth, Fig. 5 is a perspective view of the end block of the rake frame, Fig. 6 is a detail front elevation of the raising and lowering means, Fig. 7 is a top plan view showing the modified form of our invention, Fig. 8 is a longitudinal sectional view taken on the line 8—8 of Fig. 7, and Fig. 9 is a detail perspective view showing the means for guiding the rear end of the rake frame.

Like reference numerals designate corresponding parts in all the figures of the drawings.

Referring to the drawings and particularly to Figs. 1 to 6 inclusive, A designates a conventional road scraping machine of the wheeled type and including the usual main frame 5 and scraper blade 6, the latter being connected at its ends to the lower ends of vertically disposed lift rods 7—7, which are in turn respectively connected to raising and lowering means which are each designated as a whole by the reference letter B. Each raising and lowering means B consists of a bracket 8 mounted upon a respective side of the main frame 5 and carrying at its upper end a pivot pin 9 to which is fixed a worm wheel 10. A lever 11 extends from the wheel 10, and is pivotally connected at its outer end to the upper end of a respective pull rod 7. Journaled in the upper end of the bracket 8 above the worm wheel 10 is a horizontal worm shaft 12 which is formed with a worm 13 that meshes with the worm wheel 10. A hand wheel 14 is also associated with the shaft 12 for rotating said shaft to actuate the lever 11 and consequently raise and lower the respective side of the scraper blade 6. Depending from the front end of the main frame 5 is a pair of spaced vertically disposed guide bars 15—15 which are held against swinging movements by means of braces 16, the lower ends of these bars being held in spaced relation by means of a filler block 17. A rake frame, which is designated as a whole by the reference letter C, includes an end block 18. This block is formed from a single casting and includes a base 19 which is formed with a convexed rear face 20 from which inwardly project a series of radially extending threaded openings 21. Centrally extending from the base opposite the face 20 is a shank 22 having a T-shaped head 23 formed on the outer end thereof, said head consisting of a body portion 24 which is disposed at right angles to the shank 22 and ears 25—25, which extend toward the base 19 and are arranged in spaced relation to the shank 22. Centrally formed on the body portion 24 is an upwardly extending eye 26, and extending forwardly from said body portion is an eye 27. The shank 22 is disposed between the guide bars 15 and above the block 17 and the ears 25 are disposed on opposite sides of said bars. It will thus be observed in this connection that the block 18 is capable of being raised or lowered between said bars 15, and that the block is also capable of being oscillated therebetween. A plurality of rearwardly extending rake arms 28 have their forward ends respectively threaded into the openings 21 of the block 18, and it will be observed that these arms are disposed in diverging relations, the lengths of the arms being increased in progression from one side of the machine to the other. The rear ends of the arms 28 are disposed in advance of the scraper blade 6 and are each forked to form spaced ears 29—29, and each ear is centrally formed with a laterally projecting enlargement 30 wherein is formed a vertically disposed bolt-receiving opening 31. Each pair of ears 29 is connected in rear of the openings 31 by a horizontal pivot pin 32. A plurality of rake teeth 33 are each formed with a forwardly extending horizontal arm 34, each arm being disposed between a respective pair of ears 29 and fulcrumed upon the pin 32. The forward end of the arm 34 terminates in an upwardly extending stem 35, the upper end thereof being provided with a nut 36 or other suitable tensioning means. Disposed around the stem 35 and resting upon the ears 29 is a washer 37, and disposed around the stem intermediate the nut 36 and washer 37 is a coil tension spring 38 by means of which the rake tooth 33 is yieldably held in its normal position. In order to secure the rear ends of the rake arms 28 against relative lateral movement and also against relative vertical movement, a transversely disposed angle bar 39 is positioned upon the ears 29 above the projections 30, and is connected therewith by means of bolts 40 which pass through the openings 31 of said projections. In order to elevate the front end of the rake frame C and yet permit an oscillatory movement to be imparted thereto, the following mechanism is employed: Mounted upon the forward end of the main frame 5 is a bracket 41, and fulcrumed upon this bracket, as at 42, is a bell crank lever 43. A link rod 44 is formed at its lower end with an eye 45 which is engaged with the eye 26 of the end block 18 of said rake frame. The upper end of the rod 44 is pivotally connected, as at 46, to the horizontal arm 47 of said lever. Pivotally connected to the vertical arm 48 of the lever is one end of a rearwardly extending rod 49, the rear end thereof being pivotally connected, as at 50, to a hand lever 51 which is fulcrumed upon a quadrant 52, and is provided with the usual pawl 53. It will thus be observed that upon rearward movement of the lever 51, the bell crank lever 43 will be rocked upon its fulcrum, and as a result, the forward end of the rake frame through the medium of the link rod 44 will be elevated between the guide bars 15. When, however, the teeth 33 strike an obstruction, such as a stone or the like, and prevent further travel of the machine, the forward end of the rake frame C may be lowered as will be readily understood, and as a result, the points of the teeth 33 shift rearwardly from the obstructions, thereby allowing the machine to be easily backed by the draft animals. In order to oscillate the rake frame C, there is mounted upon the main frame 5 in advance of the raising and lowering means B similar means which are each designated as a whole by the reference letter D, and connecting the levers 11 of said means are the upper ends of link rods 54—54, the connections with said levers being made through the medium of eyes 55. The lower ends of the links 54 are connected to the respective ends of the angle bar 39 through the medium of eyes 56. It will thus be observed that upon manipulation of either of the raising and lowering means D, that side of the rake frame C will be raised or lowered, as will be readily understood.

In the operation of the invention as thus far described, the scraping machine A is drawn along a road by draft animals or other suitable means, and the teeth 33 loosen the ground directly in advance of the scraper blade 6, and as a result, permit said blade to readily smooth the surface of the road or gutter as the case may be. When it is desired to adjust the lateral or vertical angle of the rake frame C, either of the operating means D will be actuated, as above described. It will of course be understood that the scraper blade 6 will likewise be adjusted by either of the operating means B. When it is desired to transport the machine from place to place, all of the operating means B and D are actuated to elevate both the rear end of the rake frame C and the scraper blade 6 above the ground.

In the modified form, as shown in Figs. 7, 8 and 9 of the drawings, there is shown a main frame which is designated as a whole by the reference letter E. This frame includes a longitudinally disposed beam 57 which terminates at its rear end in a diagonally disposed arched axle 58, the beam being disposed centrally of the axle. This axle terminates in downwardly extending legs 59—59, and carried by the lower ends of these legs are outwardly extending stub shafts 60—60 for engagement with ground wheels 61—61. Depending from the forward end of the beam 57 are spaced guide bars 62—62 which are similar in construction to the guide bars 15 above described. Longitudinal braces 63—63 are each connected at its rear end to the lower end of a respective leg 59 and at its forward end to the upper end of a respective guide bar 62. The beam 57 extends forwardly beyond the guide bars 62 to form a draft tongue 64. A rake frame F, which is similar in construction to the rake frame C previously described, is disposed below the main frame E and has its front end block 18ª disposed between the guide bars 62. The only difference between the rake frame F and the rake frame C is that the angle bar 39ª of the frame F is formed at its ends with laterally extending fingers 65—65 which project through vertical openings 66—66 formed in the legs 59 of the arched axle. The outer end of each finger 65 is provided with a washer 65ª, and mounted on the finger 65 beyond the washer is a pin 67. By means of the washer 65 and pin 67, the legs 59 of the frame are prevented from lateral spreading. Attached to the eye 27 of the front end block 18 of the rake frame F is a draft element, which is designated as a whole by the reference numeral 68 and which may be of any suitable construction. In order to elevate the forward end of the rake frame F, there is mounted upon the longitudinal beam 57 a bracket 41ª, and fulcrumed upon this bracket is a bell crank lever 43ª. A link 44ª is pivotally connected at its forward end to the ear 26 of the block 18ª, and at its upper end to one arm of the lever 43ª. A rearwardly extending link rod 49ª is pivotally connected at its front end to the other arm of the bell crank lever 43ª, and the rear end of this rod is pivotally connected to a hand lever 51ª which is similar in construction to the hand lever 51. In order to oscillate the rake frame F laterally, there is mounted upon the axle 58 at each side thereof a segment 69, and fulcrumed upon each segment is a hand lever 70 having the usual pawl 71. A pair of links 72 are each pivotally connected at its lower end to a respective end of the angle bar 39ª, and at its upper end to the respective lever 70. It will thus be observed that by manipulation of either lever 70 the lateral angle of inclination of the rake frame F may be readily adjusted and by movement of both of said levers 70, the frame F may be elevated above the ground, thereby permitting the machine to be readily transported from place to place. A caster wheel 73 is connected to the lower end of the guide bars 62 and serves to support the front end of the frame E.

What is claimed is:

1. In a rake, an end block formed from a single casting including a base, and a centrally disposed rearwardly extending shank having a T-shaped head formed on its outer end and in spaced relation to the base.

2. In a rake, an end block formed from a single casting including a base having a convexed rear face, said base being formed with a plurality of openings extending inwardly from said convexed face, a centrally disposed shank extending from the face of the base opposite the convexed face, a head formed on the outer end of the shank including a body portion arranged at right angles to the shank and terminating at its ends in ears extending toward the base and arranged in spaced relation to said shank, and rake teeth carried in said openings.

3. In a rake, a wheeled frame, a pair of guide bars depending therefrom, means connecting the lower ends of said bars, an end block formed from a single casting including a base, a centrally disposed shank on said base oscillatable and vertically slidable between said bars and normally supported by said connecting means, a T-shaped head on said shank having terminal ears arranged outside of said bar and contactable with said bars to limit oscillating movement of said end block, and rake teeth carried by said base.

In testimony whereof, we affix our signatures in presence of two witnesses.

JOHN W. BENSON.
DOUGLASS H. RIGGS.

Witnesses:
B. D. PALMER,
F. D. LEIZEAR.